(12) United States Patent
Suzuki

(10) Patent No.: US 9,372,645 B2
(45) Date of Patent: Jun. 21, 2016

(54) COMMUNICATION DEVICE

(71) Applicant: Brother Kogyo Kabushiki Kaisha, Nagoya-shi, Aichi-ken (JP)

(72) Inventor: Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/602,994

(22) Filed: Jan. 22, 2015

(65) Prior Publication Data

US 2015/0205548 A1    Jul. 23, 2015

(30) Foreign Application Priority Data

Jan. 22, 2014  (JP) ................. 2014-009603

(51) Int. Cl.
  *G06F 15/00* (2006.01)
  *G06F 3/12* (2006.01)
(52) U.S. Cl.
  CPC .............. *G06F 3/1222* (2013.01); *G06F 3/121* (2013.01); *G06F 3/1234* (2013.01); *G06F 3/1238* (2013.01); *G06F 3/1288* (2013.01)
(58) Field of Classification Search
  None
  See application file for complete search history.

(56) References Cited

U.S. PATENT DOCUMENTS

2010/0164171 A1* 7/2010 Feng .................. B65H 43/00
                                                              271/264
2010/0225962 A1* 9/2010 Okigami ............. H04L 63/0492
                                                              358/1.15
2014/0313539 A1* 10/2014 Kawano .................... B41J 29/00
                                                              358/1.14
2015/0153980 A1* 6/2015 Ito ......................... G06F 3/1236
                                                              358/1.14

FOREIGN PATENT DOCUMENTS

| JP | 2004-029881 A | 1/2004 |
| JP | 2007-274214 A | 10/2007 |
| JP | 2012-194856 A | 10/2012 |

OTHER PUBLICATIONS

"What is Google Cloud Print", online, Jun. 25, 2013, <URL: https://developers.google.com/cloud-print/> and <URL: https://developers.google.com/cloud-print/docs/overview>.

* cited by examiner

*Primary Examiner* — Helen Q Zong
(74) *Attorney, Agent, or Firm* — Banner & Witcoff, Ltd.

(57) ABSTRACT

A communication device may acquire function execution information and authentication information, and execute a first determination process. The first determination process may determine whether a state of the communication device is an executable state in which the communication device is capable of executing a specific process or a non-executable state without using the authentication information. The communication device may execute a second determination process determining whether the communication device is capable of executing the communication with a second device in a case where it is determined that the state of the communication device is the executable state, and execute the communication with the second device in a case where the communication device is capable of executing the communication.

19 Claims, 4 Drawing Sheets

COMMUNICATION DEVICE

CROSS-REFERENCE TO RELATED APPLICATIONS

This application claims priority to Japanese Patent Application No. 2014-009603, filed on Jan. 22, 2014, the contents of which are hereby incorporated by reference into the present application.

TECHNICAL FIELD

The present specification discloses a technique for a communication device to execute a communication of data with another device, and execute a function relating to the data.

DESCRIPTION OF RELATED ART

Conventionally, a technique is known in which a terminal device sends data to a server, and a printer receives the data sent from the server, so that the data received by the printer is printed. For example, a service on the Internet called Google (registered trademark) Cloud Print (referred to as "GCP" below) is disclosed at "What is Google Cloud Print" (URL: https://developers.google.com/cloud-print/). For example, a user accesses a printer by using a terminal device, and causes the printer to execute a communication with a server which provides the GCP (referred to as a "GCP server" below). According to this, the printer can register printer related information including a name of the printer, a print condition which can be used by the printer (i.e. Capability), a default setting of the printer and the like, in the GCP server. Subsequently, for example, the user submits to the GCP server image data which represents an image of a print target by using the terminal device. According to this, the printer can acquire print data (i.e. data which can be interpreted by the printer) which is generated from the image data by the GCP server, and execute a print of an image represented by the print data.

SUMMARY

However, in printing executed using a server and a printer, there are situations where the printer is unable to execute printing. For example, the printer cannot execute printing in the case where the printer itself is not in a normal state (e.g., there are no print sheets, there is no ink), or in the case where the printer cannot acquire data from the server.

The present specification discloses a technique which allows a comparatively early detection of a situation in which the communication device cannot execute a target function.

A communication device disclosed herein may comprise: a processor; and a memory storing computer-readable instructions therein, the computer-readable instructions, when executed by the processor, causing the communication device to execute: acquiring function execution information from a first device, the function execution information being for the communication device to execute a target function, the target function including a communication of specific data with a second device being different from the first device and a specific process related to the specific data; acquiring authentication information from the first device, the authentication information having been generated by the second device and acquired by the first device from the second device, the authentication information being information for causing the second device to execute authentication on whether a communication with the second device is possible or not; executing a first determination process with acquisition of the function execution information as a trigger, the first determination process determining whether a state of the communication device is an executable state in which the communication device is capable of executing the specific process or a non-executable state in which the communication device is not capable of executing the specific process, the first determination process being executed without using the authentication information; executing a second determination process in a case where it is determined that the state of the communication device is the executable state in the first determination process, the second determination process determining whether or not the communication device is capable of executing the communication with the second device for executing the specific process, the second determination process being executed by attempting a communication with the second device using the acquired authentication information; in a case where it is determined that the communication device is not capable of executing the communication for executing the specific process in the second determination process, causing a first notification unit to execute a first notification related to a result of the second determination process; and executing the communication with the second device in a case where it is determined that the communication device is capable of executing the communication for executing the specific process in the second determination process.

Furthermore, a method for a communication device disclosed herein may comprise: acquiring function execution information from a first device, the function execution information being for the communication device to execute a target function, the target function including a communication of specific data with a second device being different from the first device and a specific process related to the specific data; acquiring authentication information from the first device, the authentication information having been generated by the second device and acquired by the first device from the second device, the authentication information being information for causing the second device to execute authentication on whether a communication with the second device is possible or not; executing a first determination process with acquisition of the function execution information as a trigger, the first determination process determining whether a state of the communication device is an executable state in which the communication device is capable of executing the specific process or a non-executable state in which the communication device is not capable of executing the specific process, the first determination process being executed without using the authentication information; executing a second determination process in a case where it is determined that the state of the communication device is the executable state in the first determination process, the second determination process determining whether or not the communication device is capable of executing the communication with the second device for executing the specific process, the second determination process being executed by attempting a communication with the second device using the acquired authentication information; and executing the communication with the second device in a case where it is determined that the communication device is capable of executing the communication for executing the specific process in the second determination process.

Moreover, a control method, a computer program and a non-transitory computer-readable medium which stores the computer-readable instructions, for achieving the above communication device, are also new and useful. Further, a com-

DETAILED DESCRIPTION

Figure 1:
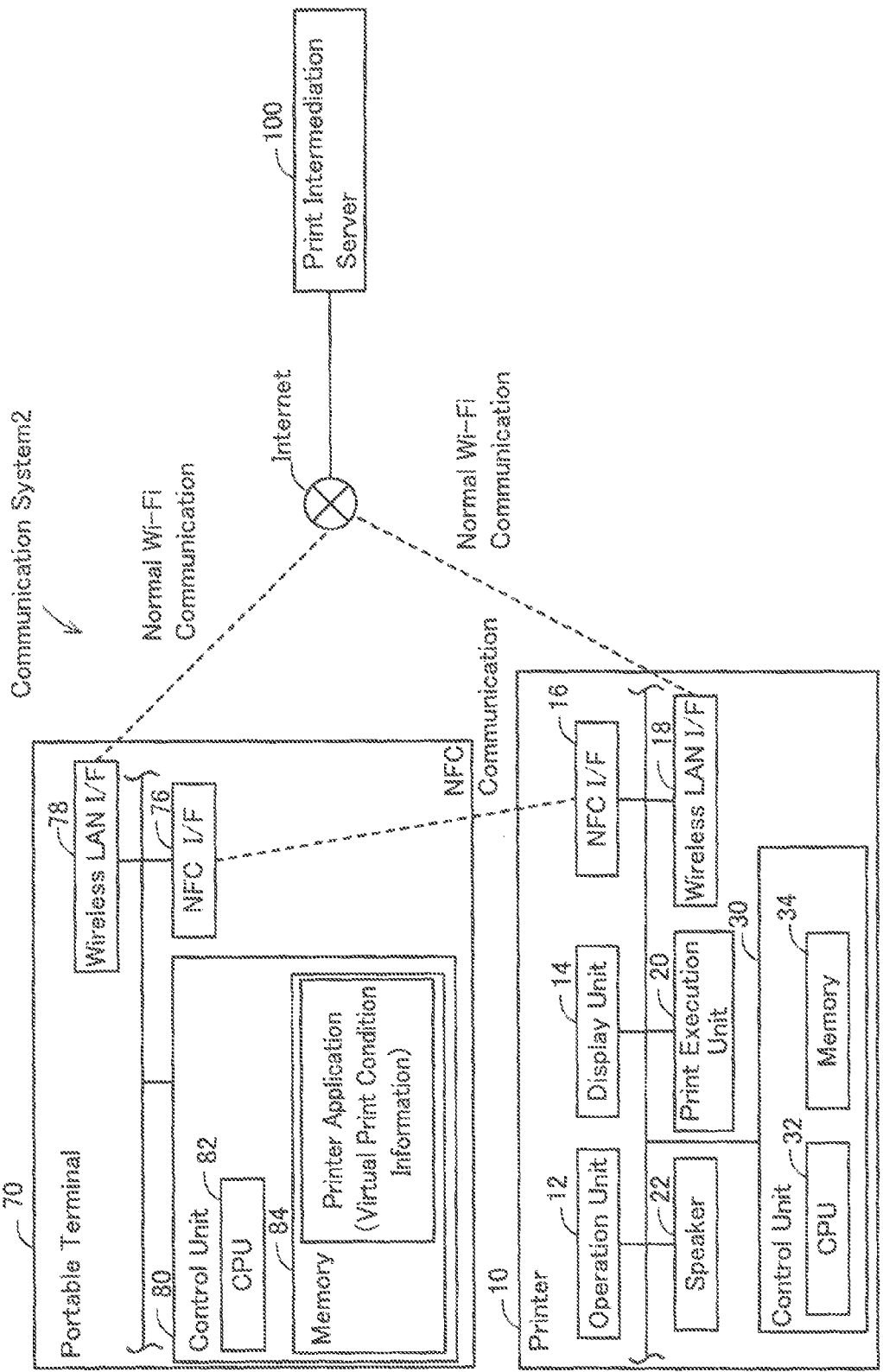
FIG. 1 illustrates a configuration of a communication system.

As illustrated in FIG. 1, a communication system 2 has a printer 10, a portable terminal 70 and a print intermediation server 100. Each of the devices 10, 70 and 100 can execute a communication with each other via the Internet.

(Configuration of Printer 10)

The printer 10 is a peripheral apparatus (i.e., peripheral apparatus of a PC or the like) which can execute a print process. The printer 10 comprises an operation unit 12 and a display unit 14. Furthermore, the printer 10 comprises an NFC (abbreviation of Near Field Communication) interface 16, and a wireless LAN (abbreviation of Local Area Network) interface 18. Furthermore, the printer 10 comprises a print execution unit 20. Further, the printer 10 comprises a speaker 22. Further, the printer 10 comprises a control unit 30. Each of the units 12 to 30 is connected to a bus line (a reference numeral is not illustrated). Hereinafter, the interface will be described as an "I/F".

The operation unit 12 comprises a plurality of keys. The user can give various instructions to the printer 10 by operating the operation unit 12. The display unit 14 is a display for displaying various pieces of information. The print execution unit 20 is a printing mechanism such as an ink jet printing or a laser printing method. The speaker 22 outputs sound in accordance with the CPU 32.

The NFC I/F 16 is an I/F (i.e., an IC chip or a communication circuit) for executing a wireless communication in accordance with the NFC scheme for a so-called short distance wireless communication (referred to as an "NFC communication" below). The NFC scheme, for example, is a wireless communication scheme based on the international standard of e.g., ISO/IEC 21481 or 18092.

The wireless LAN I/F 18 is an I/F (i.e. an IC chip or a communication circuit) for executing a wireless communication in accordance with the normal Wi-Fi scheme defined by the Wi-Fi Alliance (referred to as a "normal Wi-Fi communication" below). The normal Wi-Fi scheme, for example, is a wireless communication scheme in accordance with the standard of 802.11 of IEEE (abbreviation of The Institute of Electrical and Electronics Engineers, Inc.) or a standard (e.g., 802.11a, 11b, 11g, 11n, etc.) equivalent to this standard.

Here, a difference between the NFC I/F 16 and the wireless LAN I/F 18 will be described. A communication speed (e.g. a maximum communication speed is 11 to 600 Mbps) of a wireless communication via the wireless LAN I/F 18 is faster than a communication speed (e.g. a maximum communication speed is 100 to 424 Kbps) of a wireless communication via the NFC I/F 16. Further, a frequency of a carrier wave (e.g. a 2.4 GHz band or a 5.0 GHz band) upon a wireless communication via the wireless LAN I/F 18 is different from a frequency of a carrier wave (e.g. a 13.56 MHz band) upon a wireless communication via the NFC I/F 16. Furthermore, for example, when a distance between the NFC I/F 16 of the printer 10 and an NFC I/F of another apparatus (e.g. the portable terminal 70) is about 10 cm or less, the control unit 30 can execute an NFC communication with said apparatus via the NFC I/F 16. Meanwhile, even when a distance between the wireless LAN I/F 18 of the printer 10 and the wireless LAN I/F of another apparatus (e.g. the portable terminal 70) is 10 cm or less or 10 cm or more (e.g. about 100 m at maximum), the control unit 30 can execute a normal Wi-Fi communication with the apparatus via the wireless LAN I/F 18. That is, a maximum distance at which the printer 10 can execute a wireless communication with another apparatus via the wireless LAN I/F 18 is longer than a maximum distance at which the printer 10 can execute a wireless communication with another apparatus via the NFC I/F 16.

The control unit 30 comprises a CPU 32 and a memory 34. The CPU 32 is a processor which executes various processes in accordance with a program stored in the memory 34. The memory 34 is configured by a RAM, a ROM, a hard disk and the like. The memory 34 stores not only the above program but also various pieces of data generated or acquired in a process in which the printer 10 executes various processes.

(Configuration of Portable Terminal 70)

The portable terminal 70 is a portable terminal device such as a mobile telephone (e.g. a smartphone), a PDA, a notebook PC, a tablet PC, a digital camera, a portable music playback device or a portable movie playback device. The portable terminal 70 comprises an operation unit, a display unit (both not illustrated), and a control unit 80. Further, the portable terminal 70 comprises an NFC I/F 76 the same as the NFC I/F 16 of the printer 10, and a wireless LAN I/F 78 the same as the wireless LAN I/F 18 of the printer 10. Each of the units 76 to 80 is connected to a bus line (a reference numeral is not illustrated).

The control unit 80 comprises a CPU 82 and a memory 84. The CPU 82 is a processor which executes various processes in accordance with a program stored in the memory 84. The memory 84 is configured by a RAM, a ROM, a hard disk and the like. The memory 84 stores not only the above program but also various pieces of data generated or acquired when the portable terminal 70 executes various processes.

The memory 84 further stores a printer application (which may also be denoted as "printer appl." hereinbelow and in the drawings) which causes the printer 10 to execute a print by using the print intermediation server 100. The printer application is an application provided by a vendor (under which term manufacturer may be included herein) of the printer 10. The printer application may be installed to the portable terminal 70 from a server on the Internet or may be installed to the portable terminal 70 from a medium shipped together with the printer 10.

(Configuration of Print Intermediation Server 100)

The print intermediation server 100 is a server which is located on the Internet, and is, for example, a GCP server provided by Google (registered trademark). In this regard, in modified embodiments, the print intermediation server 100 may be a server provided by the vendor of the printer 10 or may be a server provided by a business operator different from the vendor of the printer 10.

The print intermediation server 100 is a server for executing an intermediation of a print between an external apparatus (e.g. the portable terminal 70) and a printer (e.g. the printer 10). That is, the print intermediation server 100 generates print data in a data format which can be interpreted by the printer by converting image data submitted from the external apparatus, and supplies the print data to the printer. Therefore, even when the external apparatus does not comprise a printer driver for converting the image data into the print data, the external apparatus can cause the printer to execute a print process by submitting the image data to the print intermediation server 100.

(Advance Preparation)

As described above, for example, the portable terminal 70 can cause the printer 10 to execute a print process via the print intermediation server 100. Various processes for this print process will be described below with reference to FIG. 2 to FIG. 4. Moreover, the user of the portable terminal 70 needs to execute the following advance preparation to achieve an operation of the portable terminal 70 disclosed in FIGS. 2, 3.

That is, the user needs to register account information in the print intermediation server 100 by using, for example, the portable terminal 70. The account information includes, for example, a user ID, a password and the like. Moreover, the user may register account information in the print intermediation server 100 by using another apparatus (e.g. a PC) instead of using the portable terminal 70. When the account information of the user is registered in the print intermediation server 100, the user can cause the printer 10 to execute a print process via the print intermediation server 100 by using the portable terminal 70.

Figure 2:
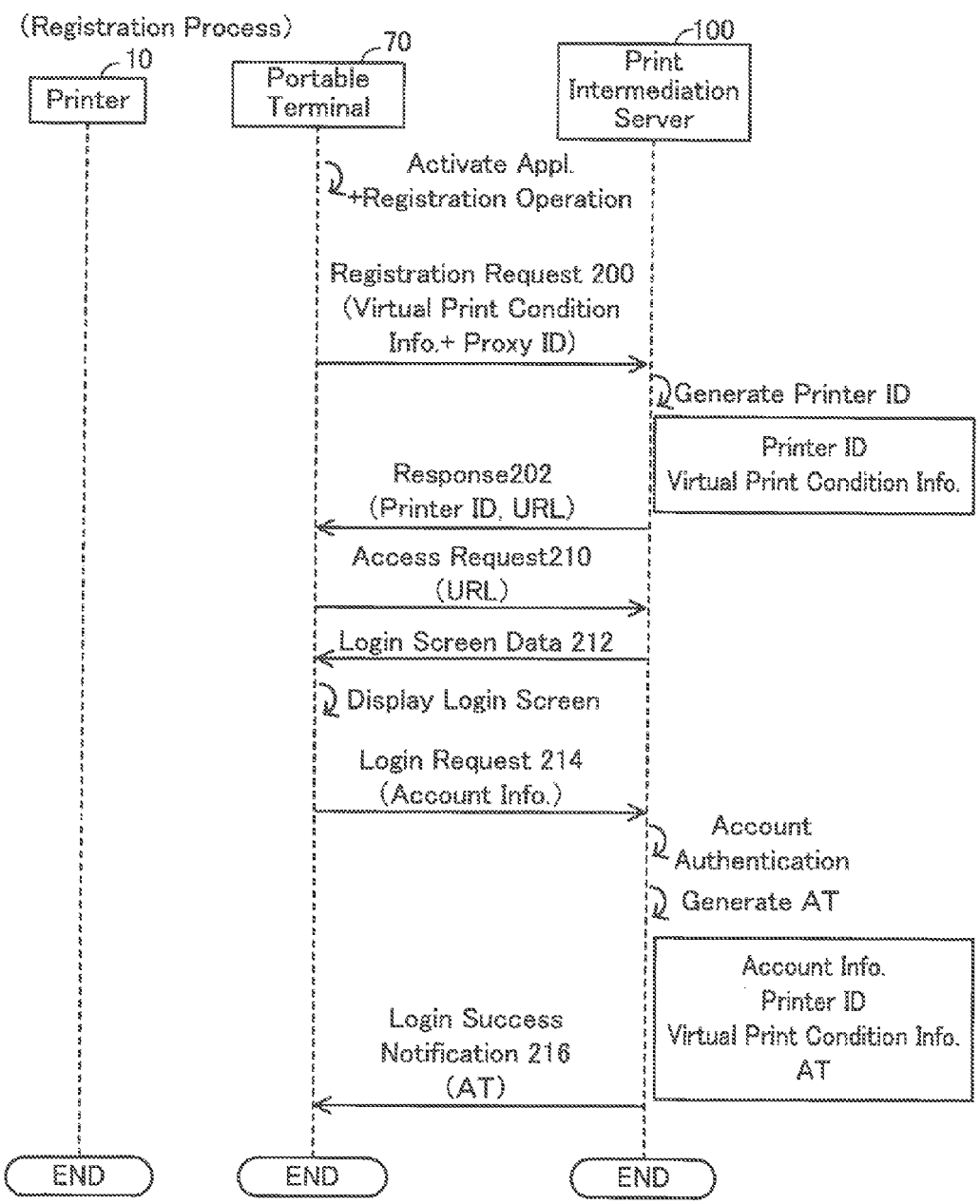
FIG. 2 illustrates a sequence diagram of a registration process.

(Registration Process; FIG. 2)

Next, a registration process for registering information which is necessary for the portable terminal 70 in the print intermediation server 100 will be described with reference to FIG. 2. In the present embodiment, the registration process using OAuth is executed.

In the registration process, the user of the portable terminal 70 may not be present near the printer 10. That is, for example, in a situation that the printer 10 is located at home and the user goes out carrying the portable terminal 70, the user can register various pieces of information in the print intermediation server 100 by using the portable terminal 70. Moreover, in the registration process, the portable terminal 70 executes a communication with the print intermediation server 100 via the wireless LAN I/F 78 (i.e., via the Internet).

The user of the portable terminal 70 first activates the printer application installed in the portable terminal 70, and selects a button indicating "Registration" on a screen which is displayed in accordance with the printer application. In this case, the CPU 82 executes each process illustrated in FIG. 2 in accordance with the printer application.

The CPU 82 first reads virtual print condition information registered in advance in the printer application, from the memory 84. The virtual print condition information is information indicating a virtual print condition which can be used by a virtual printer, not an actual printer (e.g. the printer 10), and is information determined in advance by the vendor of the printer 10. Moreover, as illustrated in FIG. 1, the virtual print condition information is registered in advance in the printer application. Hence, the virtual print condition information is not acquired from the actual printer (e.g. the printer 10), but is stored in advance in the memory 84.

The virtual print condition includes, for example, sizes of print sheets (i.e. sheet sizes) on which images need to be printed, information indicating whether it is capable of executing duplex printing, the number of colors (e.g. monochrome print or color print) and the like. In the present embodiment, the virtual print condition determined in advance includes "A4" and "B5" as sheet sizes, includes "Not available" indicating that it is not capable of duplex printing, and includes "Monochrome print" and "Color print" as the number of colors. The virtual print condition may further include other conditions such as page orientation (e.g. landscape print and portrait print).

Next, the CPU 82 acquires a proxy ID of the portable terminal 70 (i.e. an ID for identifying the portable terminal 70) from the memory 84. Then, the CPU 82 sends a registration request 200 including the virtual print condition information and the proxy ID to the print intermediation server 100. Moreover, a URL of the print intermediation server 100 (i.e. a URL of a sending destination of the registration request 200) is registered in advance in the printer application. Below, unless described in particular, the URL of the request sending destination may be a URL registered in advance in the printer application. In this regard, the URL of the request sending destination may be a URL acquired from the print intermediation server 100 before the request is sent.

When receiving the registration request 200 from the portable terminal 70, the print intermediation server 100 generates a printer ID for identifying a registration target printer by using the proxy ID included in the registration request 200. The portable terminal 70 does not specify the actual printer (e.g. the printer 10) as a registration target printer (that is, the registration request 200 does not include print condition information of the actual printer, a proxy ID of the actual printer and the like), and therefore the printer ID generated by the print intermediation server 100 is an ID for identifying a virtual printer.

The print intermediation server 100 associates the generated printer ID of the virtual printer with the virtual print condition information included in the registration request 200 and stores them. In FIG. 2, boxes on the right of the broken line corresponding to the print intermediation server 100 indicate that each piece of information in the boxes is associated with each other. The same also applies to FIG. 3 and subsequent figures.

Next, the print intermediation server 100 sends to the portable terminal 70 a response 202 including the generated printer ID and a login URL which indicates a location of login screen data 212 described below.

When receiving the response 202 from the print intermediation server 100, the CPU 82 stores in the memory 84 the printer ID included in the response 202. Next, the CPU 82 sends an access request 210 to the print intermediation server 100 via the wireless LAN I/F 78 with the login URL included in the response 202 as a sending destination.

When receiving the access request 210 from the portable terminal 70, the print intermediation server 100 sends the login screen data 212 to the portable terminal 70. The login screen data 212 is data which represents a login screen for inputting account information (i.e. a user ID, a password and the like).

When receiving the login screen data 212 from the print intermediation server 100, the CPU 82 causes the display unit of the portable terminal 70 to display the login screen represented by the login screen data 212. The user inputs into the portable terminal 70, by using the operation unit of the portable terminal 70, the account information registered in the print intermediation server 100 upon the above advance preparation. In this case, the CPU 82 sends a login request 214 including the inputted account information to the print intermediation server 100.

Moreover, although the account information is inputted to the portable terminal 70 by the user in the present embodiment, in the modified embodiments when, for example, the above advance preparation is executed by using the portable terminal 70, the memory 84 of the portable terminal 70 may store the account information. In this case, the CPU 82 may acquire the account information from the memory 84 without having the user input the account information, and send the login request 214 including the account information to the print intermediation server 100. Moreover, in a submit process, to be described, which is subsequent to the print process of FIG. 3, a modified embodiment may be adopted in a situation that a login request is sent from the portable terminal 70 to the print intermediation server 100.

When receiving the login request 214 from the portable terminal 70, the print intermediation server 100 executes authentication of the account information included in the login request 214. Specifically, the print intermediation server 100 determines whether or not the account information included in the login request 214 is already registered in the print intermediation server 100. When determining that the account information is not registered, that is, when failing to authenticate the account information, the print intermediation server 100 sends a login failure notification to the portable terminal 70, although not illustrated. In this case, the registration process is finished without executing subsequent processes.

On the other hand, when determining that the account information is already registered, that is, when succeeding to authenticate the account information, the print intermediation server 100 generates a token which is a unique character string. The token is information for authentication which is used in subsequent processes (e.g. a print process in FIG. 3). The token generated herein is referred to as an "AT (abbreviation of Authentication (or Access) Token)" below and in the drawings.

Next, the print intermediation server 100 associates the successfully authenticated account information, the printer ID of the virtual printer, the virtual print condition information and the generated AT with each other and stores them. Then, the print intermediation server 100 sends a login success notification 216 including the generated AT to the portable terminal 70.

When receiving the login success notification 216 from the print intermediation server 100, the CPU 82 stores in the memory 84 the AT included in the login success notification 216. According to this, the registration process is finished.

As described above, in the registration process, a method of registering a printer ID of a virtual printer and virtual print condition information in the print intermediation server 100 instead of registering a printer ID of an actual printer (e.g. the printer 10) and print condition information in the print intermediation server 100 is adopted. That is, the portable terminal 70 registers the printer ID of the virtual printer and the virtual print condition information in the print intermediation server 100. Hence, the user does not have to cause the printer 10 to execute a communication with the print intermediation server 100 to register the printer ID and the print condition information (and moreover, the AT) in the print intermediation server 100.

(Submit Process)

When the registration process described above has ended, the user can submit image data which represents a print target image to the print intermediation server 100 by using the portable terminal 70. As in the registration process, the user of the portable terminal 70 can submit image data to the print intermediation server 100 even when not present near the printer 10. For example, the user can submit image data which represents an image captured by the portable terminal 70 at a visiting place, to the print intermediation server 100. Moreover, the image data may be in any data format as long as the image data is data which represents a print target image, and may for example be data in a bitmap format such as JPEG (abbreviation of Joint Photographic Experts Group), may be data in a vector format, may be data in a text format or may be data in other formats.

In the submit process for submitting image data to the print intermediation server 100, the user of the portable terminal 70 executes a predetermined operation on the print intermediation server 100 (e.g., an operation to activate the printer application, select a button indicating "Submit" on the screen, and specify the image data), whereupon the portable terminal 70 and the print intermediation server 100 execute processes the same as the processes 210 to 216 of the registration process. Moreover, in the submit process, the print intermediation server 100 does not generate an AT, but sends the AT that has already been generated.

When login succeeds, the CPU 82 requests the virtual print condition from the print intermediation server 100, and acquires the virtual print condition from the print intermediation server 100. The user of the portable terminal 70 operates the portable terminal 70, and selects a print setting for printing the image from among the virtual print conditions indicated by the acquired virtual print condition information. As described below in detail, in the print intermediation server 100, print data is generated in accordance with the selected print setting, and the print data is supplied to the printer 10 (see FIG. 3).

Moreover, as described above, the selected print setting is selected from the virtual print conditions, and is not selected from the print conditions which can be actually used by the printer 10. That is, there is no guarantee that the printer 10 can execute a print process in accordance with the selected print setting. In this regard, in the present embodiment, the vendor of the printer 10 determines in advance a print condition which can be used by normal printers (e.g. all printers which are sold by the vendor) as the virtual print condition, and provides the printer application which includes the virtual print condition information indicating the virtual print condition. Consequently, in the present embodiment, the printer 10 can properly execute a print in accordance with the selected print setting.

Figure 3:
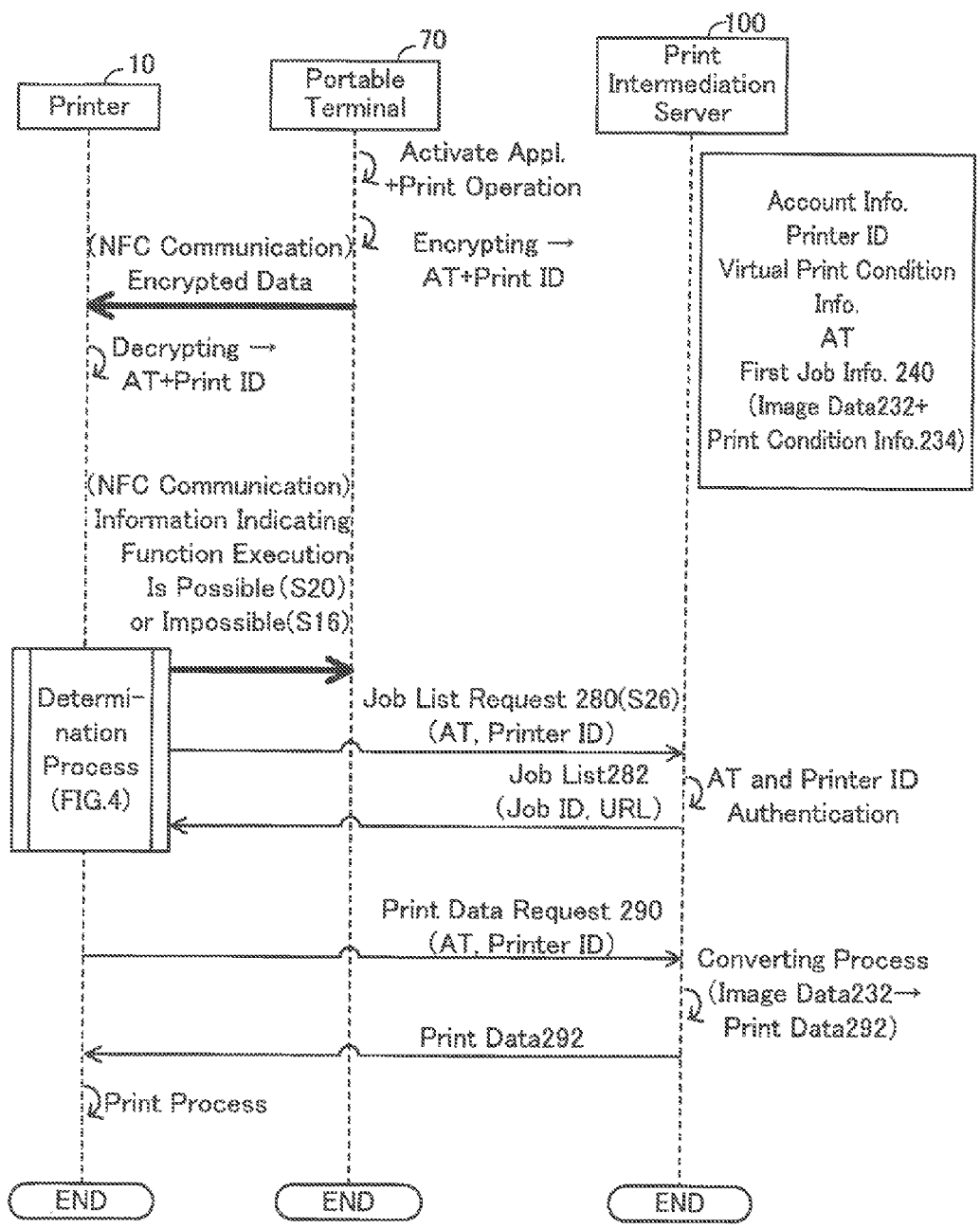
FIG. 3 illustrates a sequence diagram of a print process.

When the user selects a print setting, the portable terminal 70 sends to the print intermediation server 100 a submit request including the AT, image data 232 specified by the user (see FIG. 3), and print setting information 234 indicating the print setting selected by the user (see FIG. 3). The print intermediation server 100 executes authentication of the AT and, when authentication succeeds, associates the pieces of information included in the submit request with each other and stores them. As a result, in the print intermediation server 100, the account information, the printer ID, the virtual print condition information, and the AT stored in the registration process are associated with first job information 240 (i.e., the image data 232 and the print setting information 234) and stored (see FIG. 3).

Moreover, when the user further desires to submit other image data to the print intermediation server 100, the same operation as the above is executed. According to this, the CPU 82 can submit one or more pieces of job information to the print intermediation server 100 by executing the same process as the above.

(Print Process; FIG. 3)

Next, a print process in which the portable terminal 70 causes the printer 10 to execute a print process in accordance with job information (e.g. the first job information 240) which has already been submitted to the print intermediation server 100 will be described with reference to FIG. 3. In the print process, the user of the portable terminal 70 needs to be present near the printer 10. As described below, this is because the portable terminal 70 and the printer 10 need to execute an NFC communication. Hence, the user, for example, causes the printer 10 to execute a print process by using the portable terminal 70 and the printer 10 installed in user's house after the user has come home.

When desiring to cause the printer 10 to execute a print process in accordance with the job information submitted to the print intermediation server 100, the user of the portable terminal 70 activates the printer application, and selects a button indicating "Print" on the screen displayed in accordance with the printer application. In this case, the CPU 82 executes each process illustrated in FIG. 3 in accordance with the printer application.

The CPU 82 first acquires the AT and the printer ID (i.e. each piece of information stored in the memory 84 in the registration process in FIG. 2) from the memory 84. Moreover, the CPU 82 generates encrypted data by encrypting the AT and the printer ID by using an encryption key registered in advance in the printer application. An encryption method is not limited in particular, and is, for example, AES (abbreviation of Advanced Encryption Standard), DES (abbreviation of Data Encryption Standard) or the like.

The user of the portable terminal 70 places the portable terminal 70 close to the printer 10. When a distance between the NFC I/F 76 and the NFC I/F 16 is a predetermined distance (e.g. 10 cm) or less, the CPU 82 sends the print instruction and the encrypted data to the printer 10 via the NFC I/F 76. In this regard, the CPU 82 executes an NFC communication so that it can send the print instruction and the encrypted data to the printer 10 without using an IP address of a sending destination, a URL of the sending destination and the like. Further, as the AT and the printer ID are encrypted, it is possible to prevent a third party from illegally acquiring the AT and the printer ID.

When receiving the print instruction and the encrypted data from the portable terminal 70 via the NFC I/F 16, the CPU 32 decrypts the encrypted data by using an encryption key stored in advance in the memory 34, that is, an encryption key matching the encryption key used by the portable terminal 70. According to this, the CPU 32 can acquire the AT and the printer ID. The CPU 32 executes a determination process.

Figure 4:
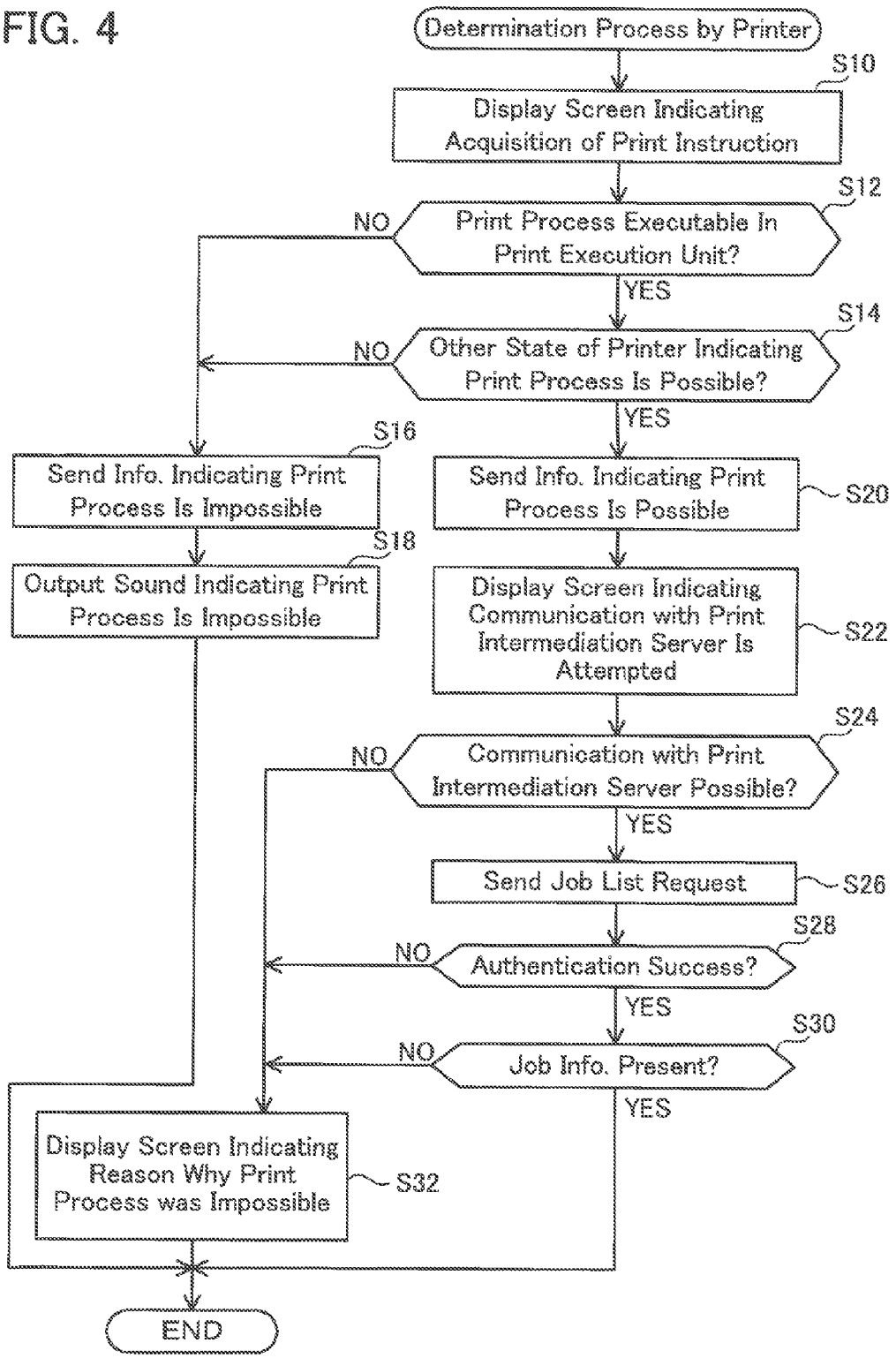
FIG. 4 illustrates a flowchart of a determination process executed by a printer.

(Determination Process; FIG. 4)

The determination process executed by the CPU 32 will be described with reference to FIG. 4. The CPU 32 starts the determination process triggered by receiving a print instruction via the NFC I/F 16.

First, in S10, when receiving the print instruction, the CPU 32 causes the display unit 14 to display an instruction acquisition screen indicating that the print instruction has been acquired. As a result, by checking the instruction acquisition screen, the user can learn that the print instruction has been appropriately acquired by the printer 10.

Next, in S12, the CPU 32 determines whether or not the print execution unit 20 is capable of executing the print process. In S12, the CPU 32 executes the determination without using the AT received from the portable terminal 70. Specifically, the CPU 32 determines a plurality of conditions that the print execution unit 20 itself requires to execute the print process correctly, such as the amount of ink remaining in the printing mechanism of the print execution unit 20, the presence or absence of print sheets in a feeding mechanism, the presence or absence of a paper jam in the feeding mechanism, and the like. In case of determining that the print process can be executed correctly in all of the plurality of conditions described above, such as there being ink remaining in the printing mechanism, that print sheets have been set in the feeding mechanism, there is no paper jam in the feeding mechanism, etc., the CPU 32 determines that the print process can be executed (YES in S12).

On the other hand, in the case of determining that the print process cannot be executed correctly in any of the plurality of conditions described above, such as when ink is not remaining in the printing mechanism, print sheets are not set in the feeding mechanism, or there is a paper jam in the feeding mechanism, etc., the CPU 32 determines that the print process cannot be executed (NO in S12). In the case of YES in S12, the process proceeds to S14, and in the case of NO in S12, the process proceeds to S16.

In S14, the CPU 32 determines whether or not a state of the printer 10 other than that of the print execution unit 20 is a state in which the print process can be executed. In S14, the CPU 32 executes the determination without using the AT. In S14, the CPU 32 executes the determination for one or more states such as a security setting state of the printer 10, a connection state of the wireless LAN I/F 18 or the like. For example, in the case where the security setting set in the printer 10 is a setting indicating that a print instruction via the NFC I/F 16 is not allowed, the CPU 32 determines that the state of the printer 10 is not a state in which the print process can be executed (NO in S14). Alternatively, for example, in the case where the wireless LAN I/F 18 is not communicatively connected to another device (e.g., an access point), the CPU 32 determines that the state of the printer 10 is not a state in which the print process can be executed (NO in S14). On the other hand, in the case where all the states in the one or more states described above are states in which the print process can be executed, such as the security setting being a setting indicating that a print instruction via the NFC I/F 16 is allowed, the wireless LAN I/F 18 being communicatively connected to another device, and the like, the CPU 32 determines YES in S14. In the case of YES in S14, the process proceeds to S20, and in the case of NO in S14, the process proceeds to S16.

In S16, the CPU 32 sends information indicating that the print process cannot be executed to the portable terminal 70 via the NFC I/F 16. Next, in S18, the CPU 32 causes the speaker 22 to output a sound indicating that the print process cannot be executed, and ends the determination process. Even if the user has moved to a location away from the printer 10, the user can learn by hearing the sound that the printer 10 cannot execute the print process. Moreover, in a modification, the CPU 32 may cause the display unit 14 to display a screen indicating that the print process cannot be executed. On the other hand, in S20 the CPU 32 sends information indicating that the print process can be executed to the portable terminal 70 via the NFC I/F 16.

When receiving the information indicating that the information indicating that the print process can be executed sent in S20, the portable terminal 70 displays, on the display unit of the portable terminal 70, a screen indicating the received information (i.e., that the printer 10 can execute the print process). According to this configuration, the user can learn whether the printer 10 can execute the print process by checking the screen displayed on the display unit of the portable terminal 70. Moreover, in a modification, the portable terminal 70 may cause the speaker of the portable terminal 70 to output a sound indicating the received information.

Next, in S22, the CPU 32 causes the display unit 14 to display a screen indicating that a communication with the print intermediation server 100 is to be attempted via the wireless LAN I/F 18 in S24, to be described (e.g., a screen including the character string "Attempting communication"). Thus, by checking the screen displayed in S22, the user can learn that the printer 10 is attempting a communication with the print intermediation server 100.

Next, in S24, the CPU 32 attempts a communication with the print intermediation server 100 via the wireless LAN I/F 18, and determines whether or not a communication with the print intermediation server 100 can be executed. Specifically, the CPU 32 sends a confirmation signal (e.g., a packet in accordance with PING), via the wireless LAN I/F 18 (i.e., via the Internet), for confirming whether or not a communication can be executed, with the URL of the print intermediation server 100 stored in advance in the memory 34 as a sending destination. In the case where a response signal is received from the print intermediation server 100 as a response to the confirmation signal before a predetermined period has passed since the sending of the confirmation signal, the CPU 32 determines that a communication with the print intermediation server 100 can be executed (YES in S24), and proceeds to S26. On the other hand, in the case where a response signal is not received from the print intermediation server 100 before the predetermined period has passed since the sending of the confirmation signal, the CPU 32 determines that a communication with the print intermediation server 100 cannot be executed (NO in S24), and proceeds to S32. For example, in the case where the URL of the print intermediation server 100 has changed, the confirmation signal cannot be sent with the URL of the print intermediation server 100 stored in advance in the memory 34 as the sending destination.

In S26, the CPU 32 sends a job list request 280 including the acquired AT and printer ID (see FIG. 3) to the print intermediation server 100 via the wireless LAN I/F 18.

As illustrated in FIG. 3, when receiving the job list request 280 from the printer 10, the print intermediation server 100 executes authentication of the AT and printer ID included in the job list request 280. In case of determining that the AT and printer ID are being stored (i.e., in case authentication of the AT and printer ID succeeds), the print intermediation server 100 determines whether or not one or more pieces of job information associated with these pieces of information are being stored in the print intermediation server 100. In the case where one or more pieces of job information associated with these pieces of information are being stored in the print intermediation server 100, a job list 282 is generated which includes, for each of the one or more pieces of job information, a job ID for identifying the one or more pieces of job information, and a URL indicating the location of print data 292, to be described. Then, the print intermediation server 100 sends the job list 282 to the printer 10.

On the other hand, in the case where it is determined that the AT and printer ID received from the printer 10 are not being stored (i.e., in the case where the authentication of the AT and printer ID failed), the print intermediation server 100 sends information indicating that the authentication has failed to the printer 10. A state in which authentication fails is, for example, the print intermediation server 100 executing the authentication, in the case where the AT has an expiration period, at a timing when the expiration period of the AT has been exceeded.

Further, in the case where job information associated with the AT and printer ID is not being stored in the print intermediation server 100, the print intermediation server 100 sends information indicating that the job information is not being stored to the printer 10. A state in which the job information is not being stored is, for example, if the user has not submitted image data, or if the user has already deleted image data which had been submitted.

Returning to FIG. 4, in S28 the CPU 32 monitors whether a response to the job list request 280 has been received via the wireless LAN I/F 18. When receiving a response to the job list request 280, if the response is information indicating that the authentication failed, the CPU 32 determines that the authentication failed (NO in S28), and proceeds to S32. On the other hand, if the response to the job list request 280 is not information indicating that the authentication failed, the CPU 32 determines that the authentication succeeded (YES in S28), and proceeds to S30.

In S30, in the case where the response to the job list request 280 is information indicating that job information is not being stored in the print intermediation server 100 (NO in S30), the CPU 32 proceeds to S32. On the other hand, in the case where the response to the job list request 280 is not information indicating that job information is not being stored in the print intermediation server 100, i.e., in the case there is the job list 282 (see FIG. 3) (YES in S30), the determination process is ended.

On the other hand, in the determination process, in the state where S32 is executed, the CPU 32 cannot acquire the print data from the print intermediation server 100, and cannot execute the print process. In this case, in S32, the CPU 32 displays a screen indicating why the print process cannot be executed, and ends the determination process. Specifically, in the case of NO in S24, in S32 the CPU 32 causes the display unit 14 to display a screen indicating that a communication between the printer 10 and the print intermediation server 100 cannot be executed (e.g., a screen including the character string "Communication with server failed"). Further, in the case of NO in S28, in S32 the CPU 32 causes the display unit 14 to display a screen indicating that the authentication failed (e.g., a screen including the character string "Authentication of AT or printer ID failed"). Further, in the case of NO in S30, in S32 the CPU 32 causes the display unit 14 to display a screen indicating that the authentication failed (e.g., a screen including the character string "Job acquisition failed").

Returning to FIG. 3, when receiving the job list 282 from the print intermediation server 100 via the wireless LAN I/F 18, the CPU 32 sends a print data request 290 via the wireless LAN I/F 18 with the URL included in the job list 282 as a sending destination. Moreover, the print data request 290 includes information indicating a data format which can be interpreted by the printer 10, the acquired AT, and the printer ID. The data format is, for example, PDF (abbreviation of Portable Document Format).

When receiving the print data request 290 from the printer 10, the print intermediation server 100 executes authentication of the AT and the printer ID included in the print data request 290, as in the case of receiving the job list request 280 described above. Then, in case of determining that the AT and the printer ID are being stored, the print intermediation server 100 executes a conversion process. That is, in accordance with the print setting information 234 included in the first job information 240, and the information indicating data format included in the print data request 290, the print intermediation server 100 generates the print data 292 by converting the image data 232 included in the first job information 240. For example, in the case where the print setting information 234 includes "XPS" as the data format, "A4" as the sheet size, "Not available" as to whether it is capable of duplex printing, and "Color" as the number of colors, the print intermediation server 100 generates the print data 292 for executing a print process of a color image on only one side of an A4 print sheet. Further, in the case where the print data request 290 includes information indicating PDF format, the print intermediation server 100 generates the print data 292 in the PDF format.

Next, the print intermediation server 100 stores the generated print data 292 in a location corresponding to the URL included in the job list 282. Then, the print intermediation server 100 sends to the printer 10 the print data 292 which is being stored in the location corresponding to the URL which is the sending destination of the print data request 290.

The CPU 32 receives the print data 292 from the print intermediation server 100 via the wireless LAN I/F 18. Thus, the CPU 32 can acquire the print data 292 from the print intermediation server 100. Then, the CPU 32 supplies the acquired print data 292 to the print execution unit 20. As a result, the print execution unit 20 prints an image represented by the print data 292 onto a print sheet. Thus, the user of the portable terminal 70 can acquire a printed print sheet.

Moreover, in the example of FIG. 3, the print intermediation server 100 is storing only the one piece of job information 240. However, if a plurality of pieces of job information (e.g., first and second job information) are being stored in the print intermediation server 100, the job list 282 includes a plurality of job IDs and a plurality of URLs.

For each of the plurality of URLs included in the job list 282, the printer 10 sequentially sends a print data request with the URL as the sending destination. Then, each time of receiving a print data request from the printer 10, the print intermediation server 100 generates print data by converting the image data included in the job information corresponding to the print data request. Thereby, the printer 10 can sequentially acquire each of the plurality of pieces of print data, and sequentially execute a print process of each of the plurality of images represented by the plurality of pieces of print data.

(Effect of Embodiment)

As described above, in the determination process of FIG. 4, the printer 10 first determines whether the print execution unit 20 can execute the print process (S12), then determines whether or not a communication with the print intermediation server 100 can be executed (S24, S28, S30). Similarly, it is first determined whether the state of the printer 10 other than the print execution unit 20 is a state in which the print process can be executed (S14). The determination processes of S12, S14 have the state of the printer 10 itself as the determination target, rather than a communication state with the print intermediation server 100 or a state of the print intermediation server 100 itself. Consequently, in the determination of S12, S14, the printer 10 does not execute a communication with the print intermediation server 100. Therefore, the determination can be made comparatively earlier than the processes S24, S28, S30, in which the determination target is the communication state with the print intermediation server 100 or the state of the print intermediation server 100 itself. As a result, in the case where the state of the printer 10 itself including the print execution unit 20 is not a state in which the print process can be executed, it is possible to determine comparatively early that the printer 10 is in a state of being unable to execute the print process target function.

Further, in the present embodiment, the printer 10 communicates with the portable terminal 70 by using the NFC I/F 16, and communicates with the print intermediation server 100 by using the wireless LAN I/F 18. According to this configuration, the printer 10 can change the interface to be used depending on the device which is to execute the communication. Further, the printer 10 can communicate with the print intermediation server 100 via the Internet.

Further, in case of the printer 10 executing an NFC communication by using the NFC I/F 16, the user of the portable terminal 70 must bring the portable terminal 70 closer to the printer 10, as described above. In the present embodiment, since the determination processes of S12, S14 can be made comparatively earlier than the determination processes of S24, S28, S30, the portable terminal 70 can acquire the information of S16 or S20 comparatively earlier as a response to the sending of the print instruction and the encrypted data by means of the NFC communication of FIG. 3. Consequently, the user of the portable terminal 70 does not need to wait for a long time for a response while keeping the portable terminal 70 close to the printer 10, thus making it easier for the user of the portable terminal 70 to use the NFC communication between the portable terminal 70 and the printer 10.

Further, in the case of a state where the print process can be executed, as a result of the process of S12, S14 of FIG. 4, whose determination is completed comparatively early, the printer 10 sends information indicating that the print process can be executed to the portable terminal 70 before attempting a communication with the print intermediation server 100 (S24). Consequently, since it is possible to supply the information indicating that the print process can be executed before executing the determination processes of S24, S28, S30, which take comparatively more time, the printer 10 can supply the information to the portable terminal 70 comparatively early.

(Correspondence Relationship)

The printer 10, the portable terminal 70, and the print intermediation server 100 are examples of "communication device", "first device" and "second device", respectively. The print instruction and printer ID are an example of "function execution information", and the AT and the printer ID are an example of "authentication information". The process of receiving the print data 292 and the print process of FIG. 3 are an example of "target function". The processes of S12, S14 of FIG. 4 are an example of "first determination process", and S24, S28, S30 of FIG. 4 are an example of "second determination process" and "process of determining whether or not the target data is capable of being received from the second device". The process of S12 of FIG. 4 is an example of "process of determining whether or not the state of the print execution unit is capable of executing the print process".

The process of acquiring the print instruction and printer ID of FIG. 3 is an example of a process executed by "first acquiring unit". The process of acquiring the AT of FIG. 3 is an example of a process executed by "second acquiring unit". The process of S32 of FIG. 4 is an example of a process executed by "first notification unit". The process of sending the print data request 290 and the process of receiving print data 292 of FIG. 3 are examples of a process executed by "communication unit". The processes S16 and S20 of FIG. 4 are examples of a process executed by "supply unit". The process of S10 of FIG. 4 is an example of a process executed by "first display unit". The process of S22 of FIG. 4 is an example of a process executed by "second display unit". The process of S18 of FIG. 4 is an example of a process executed by "second notification unit".

(Modification 1) In the embodiment described above, in the registration process of FIG. 2, a registration process using the OAuth method was executed. However, in the registration process, the registration process may be executed using the Client Login method.

In the Client Login method, the CPU 82 causes a login screen to be displayed on the display unit of the portable terminal 70 (similar to the login screen of FIG. 2) in accordance with a registration operation of the user, and acquires account information. The CPU 82 sends a login request including the account information which has been input (similar to the login request 214) to the print intermediation server 100 via the wireless LAN I/F 78. As with FIG. 2, the print intermediation server 100 receives the login request, executes authentication of the account information, generates an AT, and sends a login success notification.

When receiving the login success notification, the CPU 82 stores the AT included in the login success notification in the memory 84 and sends a registration request similar to the registration request 200 of FIG. 2 to the print intermediation server 100. When receiving the registration request from the portable terminal 70, the print intermediation server 100 generates a printer ID by using the proxy ID included in the registration request, and stores the generated printer ID and the virtual print condition information. As a result, the printer ID that has been generated, the account information, the virtual print condition information, and the AT are associated in the print intermediation server 100. Then, the print intermediation server 100 sends to the portable terminal 70 a registration success notification 322 which includes the generated printer ID.

When receiving the registration success notification 322 from the print intermediation server 100 via the wireless LAN I/F 78, the CPU 82 stores the printer ID included in the registration success notification 322 in the memory 84, and ends the registration process.

(Modification 2) In the embodiment described above, in the registration process of FIG. 2, the portable terminal 70 sends the registration request 200 which includes the virtual print condition information to the print intermediation server 100. Instead, for example, in the case where the virtual print condition information is being stored in a data server on the Internet (i.e., a server provided by the vendor of the printer 10), the portable terminal 70 may send a registration request including a URL of the virtual print condition information to the print intermediation server 100. In this case, the print intermediation server 100 may acquire the virtual print condition information from the data server by using the URL of the virtual print condition information, and store the acquired virtual print condition information. Further, in the case where the print intermediation server 100 is a server provided by the vendor of the printer 10, the print intermediation server 100 may be storing the virtual print condition information in advance. In this case, the portable terminal 70 may send a registration request that does not include either the virtual print condition information or the URL of the virtual print condition information to the print intermediation server 100.

(Modification 3) In the above embodiment, the AT generated in the registration process in FIG. 2 is registered in the print intermediation server 100 in a situation that the print process in FIG. 3 is executed. In this regard, when the print process in FIG. 3 is executed, an expiration period of the AT may have finished. Hence, in the registration process in FIG. 2, the print intermediation server 100 may generate not only the AT but also a so-called refresh token, and associate the refresh token with account information and the like and store the refresh token. In this case, the print intermediation server 100 can generate a new token by using the refresh token when the expiration period of the AT ends, and store the new token instead of the AT. Then, the portable terminal 70 receives the login success notification 216 including not only the AT but also the refresh token from the print intermediation server 100. In the print process in FIG. 3, the portable terminal 70 sends not only the AT but also the refresh token to the printer 10. In this case, when the expiration period of the AT ends, the printer 10 can generate a new token by using the refresh token, and acquire print data from the print intermediation server 100 by using the new token. In this modified embodiment, the refresh token is an example of "authentication information".

(Modification 4) In the above embodiment, "authentication information" includes the AT. However, if the print intermediation server 100 is configured to be capable of executing authentication by using only the printer ID without using the token, "authentication information" may include only the printer ID without including the token. Further, if the print intermediation server 100 is configured to be capable of executing authentication by using only the token without using the printer ID, "authentication information" may include only the token without including the printer ID. Generally speaking, "authentication information" may be any information used to execute authentication in the print intermediation server.

(Modification 5) Instead of executing a wireless communication of the NFC scheme, the printer 10 and the portable terminal 70 may execute a near field wireless communication of another communication scheme (e.g., a wireless communication of the TransferJet scheme, infrared scheme, etc.) to execute a communication of the encrypted data. In this modified embodiment, the other communication scheme is an example of "near field communication scheme". Further, instead of executing the near field wireless communication, the printer 10 and the portable terminal 70 may execute a wireless communication of the normal Wi-Fi scheme to execute a communication of the encrypted data. Further, instead of executing the wireless communication, the printer 10 and the portable terminal 70 may execute a wired communication to execute a communication of the encrypted data. That is, "first interface" may not be an interface for executing a wireless communication in accordance with a near field communication scheme, but may be an interface for executing a communication in accordance with a normal Wi-Fi scheme or a wired scheme.

(Modification 6) Instead of executing a wireless communication in accordance with the normal Wi-Fi scheme and executing a communication of various pieces of information (e.g. the registration request 200 in FIG. 2 or the like) with the print intermediation server 100, the portable terminal 70 may execute a wireless communication in accordance with a cellular scheme such as 3G or 4G and execute a communication with the print intermediation server 100. Further, the portable terminal 70 may execute a communication with the print intermediation server 100 by executing a wired communication when the portable terminal 70 is connected to the Internet with a wired connection. In this modified embodiment, the cellular scheme or the wired scheme is an example of "predetermined communication scheme".

(Modification 7) The printer 10 may execute a wired communication and execute a communication of various pieces of information (e.g. the job list request 280 in FIG. 5 or the like) with the print intermediation server 100 when the printer 10 is connected to the Internet by way of a wired connection. In this modified embodiment, a wired scheme is an example of "predetermined communication scheme".

(Modification 8) The print intermediation server 100 may not be one server and may be a plurality of servers which are configured separately. For example, the print intermediation server 100 may have a first server which executes each process illustrated by the registration process in FIG. 2 and a second server (i.e. a second server which is configured separately from the first server) which executes each process illustrated by the print process of FIG. 3. In this modified embodiment, the first server and the second server are an example of "second device".

(Modification 9) "Communication device" may not be the printer 10. For example, "communication device" may be a scanner comprising a scan execution unit for scanning a document, and a scan controller for controlling the scan execution unit. Further, "second device" may not be the print intermediation server. For example, "second device" may be an upload server to which image data scanned by a scanner is uploaded, and comprising a storage unit for storing the uploaded image data. In this modified embodiment, the scanner, the upload server, and the portable terminal 70 may execute the following scan process instead of the print process of FIG. 2. That is, the user of the portable terminal 70 may activate a scan application installed to the portable terminal 70, and select a button indicating "Scan" on a screen displayed in accordance with the scan application. As a result, the CPU 82 may acquire an AT and a scanner ID (an ID acquired instead of the printer ID in the registration process of FIG. 2) from the memory 84, and send a scan instruction, the AT and the scan ID to the scanner via the NFC I/F 76.

When receiving the scan instruction, the AT and the scan ID from the portable terminal 70, the scanner may execute a determination process similar to the determination process of FIG. 4. However, in the determination process of the present modified embodiment, in S12 of FIG. 4, a CPU of the scanner may determine whether the scan execution unit is capable of executing a scan process. Further, in S14, the CPU of the scanner may determine whether the state of the scanner other than the scan execution unit is a state capable of executing the print process. Further, in S24, S28, the CPU of the scanner may attempt communication with the upload server and execute authentication. The CPU of the scanner may not execute S26, S30 of FIG. 4. Moreover, the scanner may send image data which has been scanned to the upload server, and the upload server may store the sent image data in the storage unit. In this modified embodiment, the scan process is an example of "specific process".

(Modification 10) "First device" may not be the portable terminal 70 and may be a desktop PC or another device (e.g. a television).

(Modification 11) In the above embodiment, the CPU 32 executes a program (e.g. the printer application) in the memory 34 to implement each process in FIGS. 2 to 4. Instead, at least one process of each process in FIGS. 2 to 4 may be implemented by hardware such as a logic circuit.

The invention claimed is:

1. A communication device comprising:
   a processor; and
   a memory storing computer-readable instructions therein, the computer-readable instructions, when executed by the processor, causing the communication device to:
   acquire function execution information from a first device, the function execution information comprising information for the communication device to execute a target function, the target function including a communication of specific data with a second device that is different from the first device and a specific process related to the specific data;
   acquire authentication information from the first device, the authentication information having been generated by the second device and acquired by the first device from the second device, the authentication information comprising information for causing the second device to execute an authentication process to determine whether a communication with the second device is permitted;
   execute, without using the authentication information, a first determination process in response to acquisition of the function execution information, the first determination process comprising determining whether a state of the communication device is an executable state in which the communication device is capable of executing the specific process or a non-executable state in which the communication device is not capable of executing the specific process;
   execute a second determination process after the first determination process in a case where it is determined that the state of the communication device is the executable state in the first determination process, the second determination process determining whether the communication device is capable of executing the communication of the specific data with the second device, the second determination process comprising attempting to communicate with the second device using the acquired authentication information;
   in a case where it is determined that the communication device is not capable of executing the communication of the specific data in the second determination process, cause a first notification unit to output a first notification related to a result of the second determination process; and
   execute the communication of the specific data with the second device in a case where it is determined that the communication device is capable of executing the communication of the specific data in the second determination process.

2. The communication device as in claim 1, further comprising:
   a print execution unit,
   wherein the specific process is a print process,
   wherein execution of the communication of the specific data with the second device includes using the authentication information to receive, from the second device, target data, and
   wherein the computer-readable instructions, when executed by the processor, further cause the communication device to:
   cause the print execution unit to execute a print process using the received target data.

3. The communication device as in claim 2,
   wherein the first determination process includes determining whether a state of the print executing unit is a state capable of executing the print process, and
   wherein the second determination process includes determining whether the target data is capable of being received from the second device.

4. The communication device as in claim 1,
   wherein the computer-readable instructions, when executed by the processor, further cause the communication device to:
   in the case where it is determined that the state of the communication device is the executable state in the first determination process, supply information indicating that the state of the communication device is the executable state to the first device; and
   in the case where it is determined that the state of the communication device is the non-executable state in the first determination process, supply information indicating that the state of the communication device is the non-executable state to the first device.

5. The communication device as in claim 4,
   wherein the information indicating that the state of the communication device is the executable state is supplied after the first determination process is executed and before the second determination process is executed.

6. The communication device as in claim 1, further comprising:
   a display,
   wherein the computer-readable instructions, when executed by the processor, further cause the communication device to:

in response to the acquisition of the function execution information, cause the display to display a first screen related to the acquisition of the function execution information; and in a case where it is determined that the state of the communication device is the executable state in the first determination process, cause the display to display a second screen related to the communication with the second device.

7. The communication device as in claim 1, further comprising:
a first interface; and
a second interface being different from the first interface,
wherein the function execution information is acquired from the first device using the first interface,
wherein the authentication information is acquired from the first device using the first interface,
wherein the second determination process comprises attempting the communication with the second device using the second interface, and
wherein the communication with the second device is executed using the second interface.

8. The communication device as in claim 7,
wherein the second interface is an interface for executing a wireless communication in accordance with a predetermined communication scheme,
wherein the first interface is an interface for executing a wireless communication in accordance with a near field wireless communication scheme, and
wherein a range of the wireless communication in accordance with the near field wireless communication scheme is shorter than a range of the wireless communication in accordance with the predetermined communication scheme.

9. The communication device as in claim 7,
wherein the first interface is an interface for executing a wireless communication in accordance with a Near Field Communication (NFC) scheme.

10. The communication device as in claim 1,
wherein the first determination process is executed without attempting the communication of the specific data with the second device.

11. The communication device as in claim 1,
wherein the computer-readable instructions, when executed by the processor, further cause the communication device to:
in a case where it is determined that the state of the communication device is the non-executable state, cause a second notification unit to output a second notification related to a result of the first determination process,
wherein the first notification unit includes a display of the communication device,
wherein the display displays a screen related to the result of the second determination process as the first notification,
wherein the second notification unit includes a speaker of the communication device, and
wherein the speaker outputs a sound related to the result of the first determination process as the second notification.

12. The communication device as in claim 1,
wherein the second determination process comprises attempting the communication with the second device via the Internet, and
wherein the communication with the second device is executed via the Internet.

13. A non-transitory computer-readable medium storing computer-readable instructions for a communication device, wherein the computer-readable instructions, when executed by a processor of the communication device, cause the communication device to:
acquire function execution information from a first device, the function execution information comprising information for the communication device to execute a target function, the target function including a communication of specific data with a second device that is different from the first device and a specific process related to the specific data;
acquire authentication information from the first device, the authentication information having been generated by the second device and acquired by the first device from the second device, the authentication information comprising information for causing the second device to execute an authentication process to determine whether a communication with the second device is permitted;
execute, without using the authentication information, a first determination process in response to acquisition of the function execution information, the first determination process comprising determining whether a state of the communication device is an executable state in which the communication device is capable of executing the specific process or a non-executable state in which the communication device is not capable of executing the specific process;
execute a second determination process after the first determination process in a case where it is determined that the state of the communication device is the executable state in the first determination process, the second determination process determining whether the communication device is capable of executing the communication of the specific data with the second device, the second determination process comprising attempting to communicate with the second device using the acquired authentication information;
in a case where it is determined that the communication device is not capable of executing the communication of the specific data in the second determination process, cause a first notification unit to output a first notification related to a result of the second determination process; and
execute the communication of the specific data with the second device in a case where it is determined that the communication device is capable of executing the communication of the specific data in the second determination process.

14. A method for a communication device, the method comprising:
acquiring, by the communication device, function execution information from a first device, the function execution information comprising information for the communication device to execute a target function, the target function including a communication of specific data with a second device that is different from the first device and a specific process related to the specific data;
acquiring authentication information from the first device, the authentication information having been generated by the second device and acquired by the first device from the second device, the authentication information comprising information for causing the second device to execute an authentication process to determine whether a communication with the second device is permitted;
executing, without using the authentication information, a first determination process in response to acquisition of the function execution information, the first determination process comprising determining whether a state of the communication device is an executable state in which the communication device is capable of executing the specific process or a non-executable state in which the communication device is not capable of executing the specific process;

executing a second determination process after the first determination process in a case where it is determined that the state of the communication device is the executable state in the first determination process, the second determination process determining whether the communication device is capable of executing the communication of the specific data with the second device, the second determination process comprising attempting to communicate with the second device using the acquired authentication information; and executing the communication of the specific data with the second device in a case where it is determined that the communication device is capable of executing the communication of the specific data in the second determination process.

15. The method of claim 14, further comprising:

after executing the communication of the specific data with the second device, printing based on the specific data.

16. The method of claim 14, further comprising:

after executing the first determination process, transmitting, to the first device, information indicating that the state of the communication device is the executable state.

17. The non-transitory computer-readable medium of claim 13, wherein the computer-readable instructions, when executed by the processor of the communication device, further cause the communication device to:

after executing the communication of the specific data with the second device, cause a printing mechanism to print based on the specific data.

18. The non-transitory computer-readable medium of claim 13, wherein the computer-readable instructions, when executed by the processor of the communication device, further cause the communication device to:

after executing the first determination process, transmit, to the first device, information indicating that the state of the communication device is the executable state.

19. The non-transitory computer-readable medium of claim 13, wherein the computer-readable instructions, when executed by the processor of the communication device, further cause the communication device to:

in a case where it is determined that the state of the communication device is the non-executable state in the first determination process, cause a speaker or display to output a notification indicating a result of the first determination process.

* * * * *